United States Patent Office 3,552,915
Patented Jan. 5, 1971

3,552,915
SINTERED WOLLASTONITE
David Rostoker, Corning, N.Y., assignor to Corning Glass Works, Corning, N.Y., a corporation of New York
No Drawing. Filed Apr. 20, 1967, Ser. No. 632,199
Int. Cl. C01b 33/00; B29d 27/08
U.S. Cl. 23—110          1 Claim

ABSTRACT OF THE DISCLOSURE

This invention relates to the manufacture of porous bodies of fibrous beta-wollastonite by sintering preformed bodies of beta-wollastonite at a temperature of about 1150° C. which is near but below that at which beta-wollastonite undergoes a phase transformation to alpha-wollastonite. These bodies are particularly useful as kiln furniture.

CROSS REFERENCE

In my co-pending application, Ser. No. 632,671, filed concurrently herewith and now abandoned, I have disclosed that substantial additions of wollastonite to autoclave-cured cementitious bodies enhance the properties thereof, and that those bodies can be fired at high temperature to form bodies of sintered alpha-wollastonite or sintered beta-wollastonite.

BACKGROUND OF THE INVENTION

Wollastonite is a naturally occurring fibrous form of calcium metasilicate having a theoretical composition of about 52% $SiO_2$ and 48% CaO by weight. This mineral is relatively inexpensive and readily available from large deposits in the United States of America, particularly in the states of California and New York. While the most widespread use of wollastonite has been as a tile body additive, other uses include vitrified binders for abrasive grind stones, glazes of all kinds, terra-cotta, low loss dielectric insulators, frits for glazes, and ceramic pigments. Wollastonite has been used in small amounts principally to improve the firing characteristics of and to help reduce moisture expansion in sintered ceramic bodies. Curiously, although considerable research has been done and numerous papers have been written concerning wollastonite, its uses and its properties, no large scale use of this mineral has been developed. This is witnessed by the fact that the California deposits have not been worked since the mid 1950's.

SUMMARY OF THE INVENTION

I have discovered that I can manufacture porous and thermal-shock resistant bodies of ground beta-wollastonite. This is done by forming ground beta-wollastonite into the desired shape and then sintering the body thus formed in a particular manner. The sintering temperature is slightly less than the temperature at which beta-wollastonite will undergo a phase change, or phase inversion, to alpha-wollastonite. Furthermore, I have found that such bodies exhibit little, if any, dimensional change during the sintering operation, regardless of the forming methods used. These bodies can be utilized as kiln furniture where advantage can be taken of their thermal-shock characteristics, or as porous ceramic molds wherein the porosity and pore size thereof can be utilized to advantage.

DESCRIPTION OF THE PREFERRED EMBODIMENT

The two preferred methods for forming the beta-wollastonite bodies are isostatic pressing and injection molding. Isostatic pressing is well known in the art and essentially comprises placing a quantity of wollastonite into a standard wet bag mold of the desired shape, subjecting the mold and its contents to isostatic pressure, and then removing the pressed body. The injection molding method comprises mixing the wollastonite with an organic vehicle such as paradichlorobenzene and lesser amounts of a carbowax binder and zinc stearate surfactant. This mixture is then injected into a die of the desired shape, removed, and allowed to air dry so as to allow the organics to sublime. The remaining body is essentially all beta-wollastonite of the desired shape. Bodies of various shapes and sizes are thus formed by utilizing either method.

The formed or green bodies are then sintered so as to form a stronger, more cohesive body. I have found that the most desirable temperature at which to sinter and still retain a beta-wollastonite body is slightly below the phase transformation temperature. The phase transformation temperature is the temperature at which, upon heating, the beta-wollastonite undergoes a phase transformation to alpha-wollastonite. Upon cooling through this temperature, the alpha-wollastonite does not transform back into beta-wollastonite. The phase transformation temperature can vary somewhat, depending upon the amount and type of impurities present in the wollastonite. I have found that it is about 1160° C. for beta-wollastonite obtained from New York State deposits.

Sintering of the beta-wollastonite will occur only at temperatures near but below the phase transformation temperature. If the sintering is performed at a temperature above the phase transformation temperature, the beta-wollastonite will transform to the less thermal-shock resistant alpha-wollastonite. Hence, to have a sintered beta-wollastonite body, sintering must be done below the phase transformation temperature. However, I have discovered that if the sintering is attempted at a temperature considerably below the phase transformation temperature, sintering will not occur and the body will remain essentially in the green state. The best product can be obtained by sintering at a temperature in the range defined by the beta-to-alpha wollastonite phase transformation temperature and 75° C. therebelow. This is surprising in that sintering of ceramic bodies is usually thought to occur over a comparatively wide range of temperatures. Therefore, I have a unique and novel method for sintering bodies of beta-wollastonite.

This sintering is a very rapid process and the time necessary to completely sinter the body is essentially equivalent to the time necessary for the entire body to reach the sintering temperature. Hence, it is seen that the sintering time is primarily related to the size and mass of the body and the thermal conductivity of beta-wollastonite. However, although sintering times as short as a few minutes are sufficient for thin-walled bodies, very extended firing periods do not deleteriously affect the properties of the bodies, but such long times are not economically feasible.

The sintering occurs only at the points at which the wollastonite grains contact each other. After the initial point contact, the sintering appears to cease in that there is no further growth of the initial point contact. Normal grain growing techniques have not resulted in an increase in the size of the contact area.

Beta-wollastonite is an anhydrous material so that there is no loss of water upon heating to the sintering temperature and, hence, no volume change. This fact coupled with the fact that the fibers only point contact sinter, thereby precluding the densification or shrinkage of the body, explains why the body undergoes little, if any, volume change during sintering. For example, a tube isostatically formed about a cylindrically-shaped mandrel can be removed from the mandrel, sintered, and then replaced on the same mandrel without any subsequent machining.

The bodies thus made combine two unique properties: porosity and thermal-shock resistance. The porosity is a result of the point sintering of the grains. Total porosity normally ranges about 25%–35% with the pore sizes ranging from about .2 micron to 1.5 microns. The thermal-shock resistance of the body is related to its low coefficient of expansion about $60 \times 10^{-7}/°$ C., which in turn is related to the coefficient of expansion of unsintered beta-wollastonite which is about $65 \times 10^{-7}/°$ C.

As indicated above, if the body is sintered at a temperature above the phase transformation temperature, the beta-wollastonite will undergo a phase change. The alpha-wollastonite bodies have a coefficient of thermal expansion of $120 \times 10^{-7}/°$ C. which is twice as high as that of the beta-wollastonite bodies. Thus, the sintered alpha-wollastonite bodies are less desirable from a thermal-shock point of view than the sintered beta-wollastonite bodies. For this reason, the sintering temperature is maintained near but below the phase inversion temperature.

The sintered beta-wollastonite has proven very useful in making kiln furniture for use up to about 1150° C. Crucibles for use in the manufacture of foam glass can be made of sintered beta-wollastonite. These crucibles can be removed from the furnace and cooled very rapidly without fear of checking or cracking. After cooling, the charge may be loosened by forcing air from the outside of the crucible through and against the charge therein. It is expected that this material will replace some of the more expensive refractory materials such as codierite, petalite, or alumina, which are used in the range of 950° to 1150° C. This replacement results from the fact that the sintered beta-wollastonite is better and less expensive than the other materials for those applications.

My invention is further illustrated by the following examples:

EXAMPLE I

One pound of ground, beneficiated beta-wollastonite from Willsboro, N.Y., of an average particle size of twenty-three microns, was poured into an isostatic pressing mold of standard cylindrical configuration. The filled mold was then subjected to an isostatic pressure of 20,000 p.s.i. The pressed or green beta-wollastonite body was then removed from the mold and fired at 1150° C. for about 30 minutes, a time sufficient for the interior of the body to reach 1150° C. It was not necessary to preheat or slowly heat the body; it was placed directly into the furnace at 1150° C. from room temperature. Similarly, the body was removed from the furnace and cooled in the ambient atmosphere to room temperature. There was no need for a slow cool. The body was tested for strength in the conventional manner and exhibited a modulus of rupture (MOR) of 1200 p.s.i. and a total porosity of 30%.

EXAMPLE II

A green billet formed as in Example I was fired at 1075° C. for 30 minutes. The body was found to have a MOR only slightly greater than that of the green body, thus indicating that little, if any, sintering had occurred.

EXAMPLE III 2500 grams of beta-wollastonite, as in Example I, 391 grams of paradicholorobenzene, 36.5 grams of zinc stearate, and 25 grams of Carbowax 20M were mixed at 50° C. The batch was then extruded into a cylindrical rod mold, using a standard plastic extrusion press. The green bodies were air dried for 48 hours and then fired as in Example I. The strength and porosity of the thus formed bodies were similar to the strength and porosity of the bodies of Example I.

EXAMPLE IV

A green billet formed as in Example I was fired at 1300° C. for 30 minutes. The body was found to be sintered alpha-wollastonite. The body exhibited the following properties: (1) MOR of 3000 p.s.i., (2) total porosity of 35%, (3) pore sizes from 2 to 4 microns, and (4) a coefficient of thermal expansion of $120 \times 10^{-7}/°$ C.

I claim:
1. A porous body consisting of sintered beta-wollastonite having a coefficient of expansion of about $60 \times 10^{-7}/°$ C., wherein the total porosity is 25–35% and the range of pore sizes is about 0.2–1.5 microns.

References Cited

UNITED STATES PATENTS 2,910,760  11/1959  Jackson _____ 106—63

OTHER REFERENCES

Chemical Abstracts 65:13264f.

Mellor: Comprehensive Treatise on Inorganic and Theoretical Chemistry, vol. 6 (1925) pp. 353–357.

OSCAR R. VERTIZ, Primary Examiner

H. S. MILLER, Assistant Examiner

U.S. Cl. X.R.

264—125